United States Patent
Chen et al.

(10) Patent No.: US 7,742,266 B2
(45) Date of Patent: Jun. 22, 2010

(54) ESD/EOS PROTECTION CIRCUIT AND RELATED INTEGRATED CIRCUIT

(75) Inventors: Yu-Chen Chen, Taipei (TW); Jen-Hao Pan, Taipei (TW); Chih-Kuo Sun, Taipei (TW)

(73) Assignee: ALI Corporation, Taipei (TW)

( * ) Notice: Subject to any disclaimer, the term of this patent is extended or adjusted under 35 U.S.C. 154(b) by 317 days.

(21) Appl. No.: 11/857,436

(22) Filed: Sep. 18, 2007

(65) Prior Publication Data

US 2009/0073619 A1    Mar. 19, 2009

(51) Int. Cl.
*H02H 9/00*    (2006.01)

(52) U.S. Cl. .......................... 361/56; 361/111

(58) Field of Classification Search .................... 361/56, 361/111
See application file for complete search history.

(56) References Cited

U.S. PATENT DOCUMENTS

| | | | | |
|---|---|---|---|---|
| 5,543,650 A | * | 8/1996 | Au et al. | 257/355 |
| 5,563,548 A | * | 10/1996 | Kim et al. | 327/537 |
| 5,614,842 A | * | 3/1997 | Doke et al. | 326/58 |
| 5,903,420 A | * | 5/1999 | Ham | 361/56 |
| 6,034,552 A | * | 3/2000 | Chang et al. | 326/83 |
| 6,291,964 B1 | * | 9/2001 | Chen et al. | 320/166 |
| 7,106,563 B2 | * | 9/2006 | Lai et al. | 361/56 |
| 7,195,958 B1 | | 3/2007 | Huang et al. | |
| 7,202,114 B2 | | 4/2007 | Salcedo et al. | |
| 7,202,527 B2 | | 4/2007 | Esmark et al. | |
| 7,242,559 B2 | * | 7/2007 | An | 361/56 |
| 7,354,813 B2 | * | 4/2008 | Kwon et al. | 438/197 |
| 2003/0235022 A1 | * | 12/2003 | Lai et al. | 361/111 |
| 2006/0087779 A1 | * | 4/2006 | Chen et al. | 361/56 |

* cited by examiner

*Primary Examiner*—Jared J Fureman
*Assistant Examiner*—Christopher J Clark
(74) *Attorney, Agent, or Firm*—Winston Hsu

(57) ABSTRACT

An ESD/EOS protection circuit includes a first protection circuit and a second protection circuit. The first protection circuit is coupled between an I/O pad and a power pad and includes a first P-type transistor. The P-type transistor includes a control node, a floating gate, a first connection node, and a second connection node, wherein the first connection node of the first P-type transistor is coupled to the power pad and the second connection node of the first P-type transistor is coupled to the I/O pad. The second protection circuit is coupled between the I/O pad and a ground pad.

11 Claims, 4 Drawing Sheets

ESD/EOS PROTECTION CIRCUIT AND RELATED INTEGRATED CIRCUIT

BACKGROUND OF THE INVENTION

1. Field of the Invention

The present invention relates to an ESD/EOS protection circuit and related integrated circuit, and more particularly, to an ESD/EOS protection circuit and related integrated circuit with improved EOS (Electrical Over Stress) performance.

2. Description of the Prior Art

Electrical charges caused by electrostatic discharge (ESD) effects and Electrical Over-Stress (EOS) effects may destroy internal circuits of an integrated circuit. In order to solve the problem caused by the ESD/EOS effect, an ESD/EOS protection circuit is set to couple with at least an I/O port and a voltage source (VDD/VSS). When the ESD effect occurs, the ESD/EOS protection circuit has to provide a low-resistance discharge path so that the ESD pulses with extremely high peak values can be discharged through the low-resistance discharge path without destroying the internal circuit. An EOS (Electrical Over-Stress) occurs when a voltage greater than the maximum specified voltage is applied to any portion of an electronic device. This excess voltage will often cause excess current to flow along some electrical paths in the electronic device. If the current remains too long, heating of the electronic device will occur and result in a permanent damage. In addition, when the internal circuits of the electronic device normally operate, the ESD/EOS protection circuit should not affect operations and functions of the internal circuits.

The traditional ESD/EOS protection circuit is designed for preventing leakage from the I/O port to the VDD or VSS port in normal usage. But if we use a clamping circuit between the I/O port and the VDD port, a leakage current may occur, which is not allowed in some specifications. Hence, the clamping circuit can be applied between the I/O port and the VSS port only. MOS transistors are generally and widely used in ESD/EOS protection circuits, and the induced snap-back effect can therefore supply a low-resistance static discharge path. However, unstable system power supply would produce unexpected voltage pulse (i.e. EOS) to damage the ESD/EOS protection circuit through the I/O port, especially the MOS transistor's gate oxide.

SUMMARY OF THE INVENTION

The claimed invention provides an ESD/EOS protection circuit. The ESD/EOS protection circuit includes a first protection circuit and a second protection circuit. The first protection circuit is coupled between an I/O pad and a power pad and includes a first P-type transistor. The P-type transistor includes a control node, a floating gate, a first connection node, and a second connection node, wherein the first connection node of the first P-type transistor is coupled to the power pad and the second connection node of the first P-type transistor is coupled to the I/O pad. The second protection circuit is coupled between the I/O pad and a ground pad.

In one embodiment, the first protection circuit further comprises at least a second P-type transistor. The first P-type transistor and the second P-type transistor are cascoded between the power pad and the I/O pad, and the second P-type transistor has a floating gate.

In one embodiment, the second protection circuit comprises a diode.

In one embodiment, the control node of the first P-type transistor is coupled to a bias voltage.

In one embodiment, the first protection circuit further includes a third P-type transistor. The third P-type transistor has a control node, a floating gate, a first connection node and a second connection node, where the control node of the third P-type transistor is coupled to the ground pad, the second connection node of the third P-type transistor is coupled to the control node of the first P-type transistor, and the first connection node of the third P-type transistor is floating for providing the bias voltage to the first P-type transistor.

The claimed invention provides an integrated circuit with ESD/EOS protection. The integrated circuit includes an internal circuit, a first protection circuit, and a second protection circuit. The internal circuit is coupled to an I/O pad, a power pad, and a ground pad of the integrated circuit. The first protection circuit is coupled between the I/O pad and the power pad and includes a first P-type transistor. The first P-type transistor has a control node, a floating gate, a first connection node, and a second connection node, wherein the first connection node of the first P-type transistor is coupled to the power pad, and the second connection node of the first P-type transistor is coupled to the I/O pad. The second protection circuit is coupled between the I/O pad and the ground pad.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
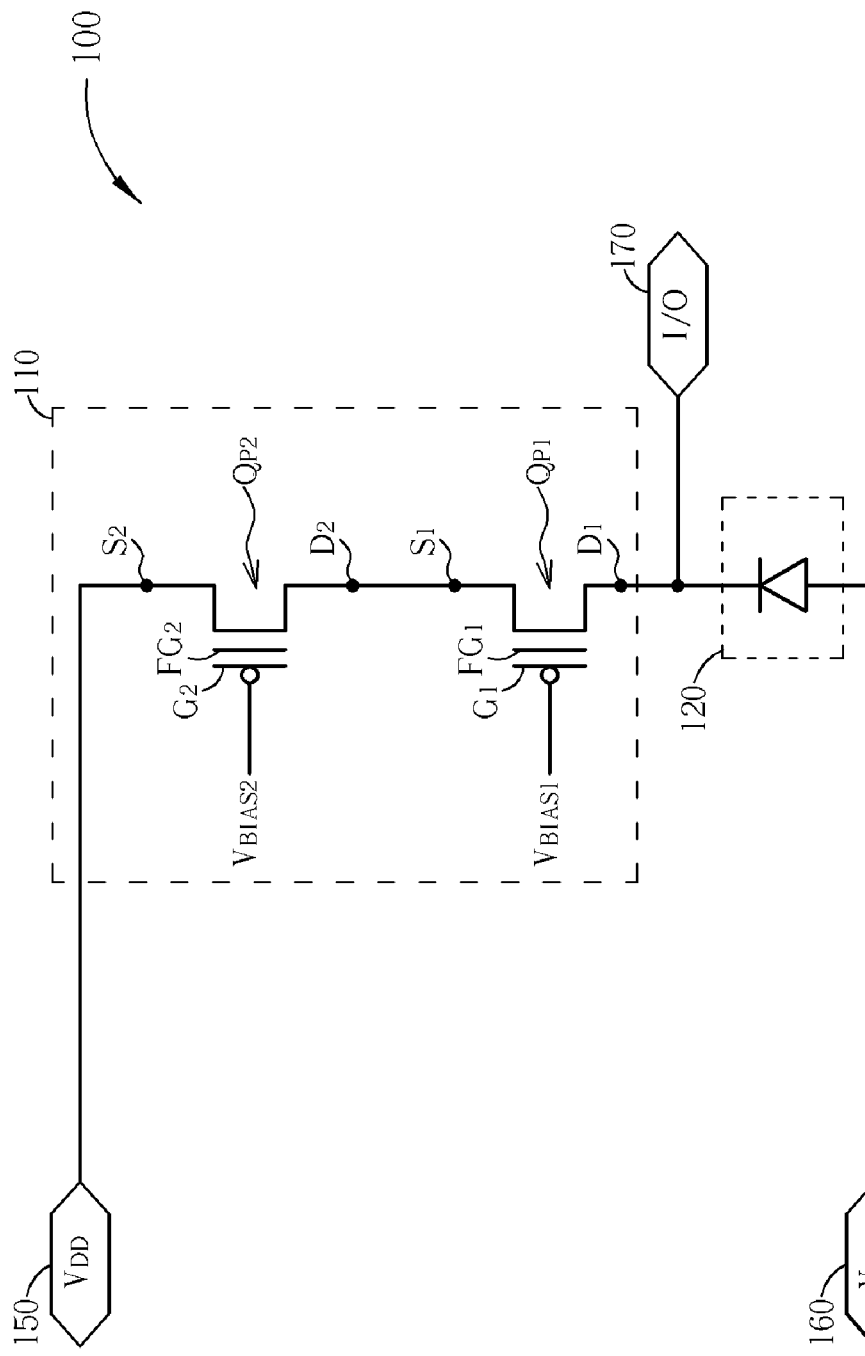
FIG. 1 is a diagram of an ESD/EOS protection circuit according to an embodiment of the present invention.

Please refer to FIG. 1. FIG. 1 is a diagram of an ESD/EOS protection circuit 100 according to an embodiment of the present invention. The ESD/EOS protection circuit 100 includes a first protection circuit 110 and a second protection circuit 120. The first protection circuit 110 is coupled between an I/O pad 170 and a power pad 150. The first protection circuit 110 includes, but not limited to, a first P-type transistor $Q_{P1}$ and at least a second P-type transistor $Q_{P2}$, wherein the first P-type transistor $Q_{P1}$ and the second P-type transistor $Q_{P2}$ are cascoded between the power pad 150 and the I/O pad 170. In this embodiment, only one second P-type transistor $Q_{P2}$ is shown in FIG. 1 for simplicity.

The first P-type transistor $Q_{P1}$ has a control node $G_1$, a floating gate $FG_1$, a first connection node $S_1$, and a second connection node $D_1$, wherein the control node $G_1$ of the first P-type transistor $Q_{P1}$ is coupled to a first bias voltage $V_{BIAS1}$, the first connection node $S_1$ of the first P-type transistor $Q_{P1}$ is coupled to the second P-type transistor $Q_{P2}$, and the second connection node $D_1$ of the first P-type transistor $Q_{P1}$ is coupled to the I/O pad 170. The second P-type transistor $Q_{P2}$ has a control node $G_2$, a floating gate $FG_2$, a first connection node $S_2$, and a second connection node $D_2$, wherein the control node $G_2$ of the second P-type transistor $Q_{P2}$ is coupled to a second bias voltage $V_{BIAS2}$, the first connection node $S_2$ of the second P-type transistor $Q_{P2}$ is coupled to the power pad 150, the second connection node $D_2$ of the second P-type transistor $Q_{P2}$ is coupled to the first connection node $S_1$ of the first P-type transistor $Q_{P1}$. In this exemplary embodiment, the second protection circuit 120 is implemented using a diode.

Please keep referring to FIG. 1. In this embodiment, the first protection circuit 110 provides a path for discharging positive ESD pulses and the second protection circuit 120 provides a path for discharging negative ESD pulses. When a negative ESD pulse occurs at the I/O pad 170, the diode is turned on to discharge the negative ESD pulse from the I/O pad 170 to the ground pad 160. In normal operations (such as +5V), the first P-type transistor $Q_{P1}$ and the second P-type transistor $Q_{P2}$ are both turned off. Therefore, no leakage current will occur flowing from the I/O pad 170 to the power pad 150. When a larger positive ESD pulse (such as +15V~+20V) occurs at the I/O pad 170, the first P-type transistor $Q_{P1}$ and the second P-type transistor $Q_{P2}$ are turned on in a very short time. Therefore, the larger positive ESD pulse is discharged through the first P-type transistor $Q_{P1}$ and the second P-type transistor $Q_{P2}$ to the power pad 150. After the larger positive ESD pulse is discharged, the first P-type transistor $Q_{P1}$ and the second P-type transistor $Q_{P2}$ are turned off again.

Please note that, the first bias voltage $V_{BIAS1}$ and the second bias voltage $V_{BIAS2}$ can be adjusted depending on circuit's demand. The number of the second P-type transistor $Q_{P2}$ is not limited to one only, and can be expanded to a plurality of second P-type transistor $Q_{P2}$ cascoded. In other words, the number of implemented transistors cascoded between power pad 150 and the I/O pad 170 depends on EOS design requirements. Furthermore, the second protection circuit 120 is not limited to be implemented using the diode, and can be realized using an SCR (silicon control rectifier) or a MOSFET (metal oxide semiconductor field effect transistor). These alternative designs all fall within the scope of the present invention.

Figure 2:
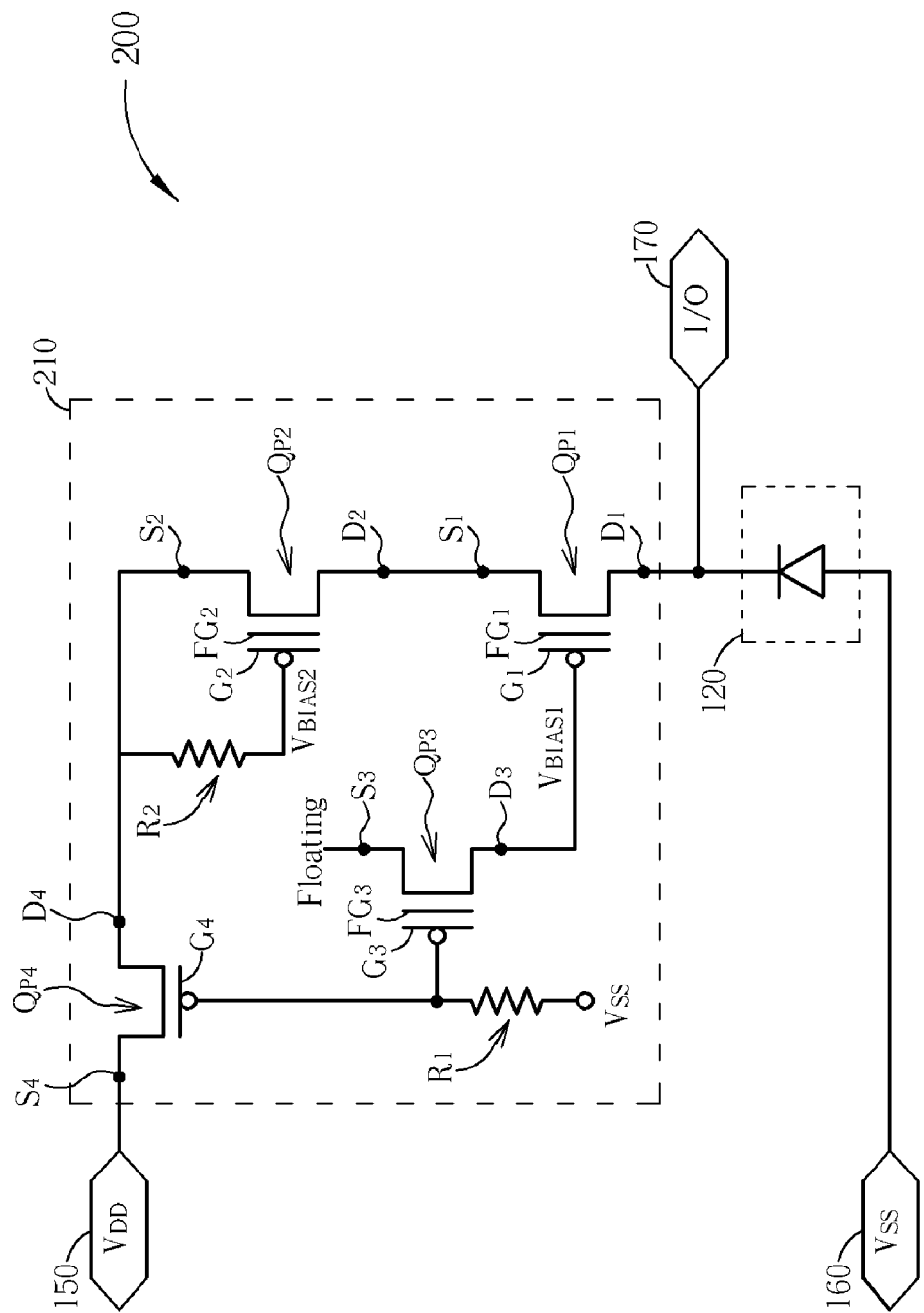
FIG. 2 is a diagram of an ESD/EOS protection circuit according to another embodiment of the present invention.

Of course, additional circuit elements are allowed to be added to aforementioned exemplary ESD/EOS protection circuit. Please refer to FIG. 2. FIG. 2 is a diagram of an ESD/EOS protection circuit 200 according to another embodiment of the present invention. The difference between the ESD/EOS protection circuit 200 and the ESD/EOS protection circuit 100 is that a first protection circuit 210 of the ESD/EOS protection circuit 200 further includes a third P-type transistor $Q_{P3}$, a fourth P-type transistor $Q_{P4}$, a first resistor $R_1$, and a second resistor $R_4$. The third P-type transistor $Q_{P3}$ has a control node $G_3$, a floating gate $FG_3$, a first connection node $S_3$ and a second connection node $D_3$, where the control node $G_3$ of the third P-type transistor $Q_{P3}$ is coupled to the first resistor $R_1$ and then coupled to the ground pad 160 through the first resistor $R_1$, the second connection node $D_3$ of the third P-type transistor $Q_{P3}$ is coupled to the control node $G_1$ of the first P-type transistor $Q_{P1}$, and the first connection node $S_3$ of the third P-type transistor $Q_{P3}$ is floating. The third P-type transistor $Q_{P3}$ is used for providing the first bias voltage $V_{BIAS1}$ to the first P-type transistor $Q_{P1}$. The fourth P-type transistor $Q_{P4}$ has a control node $G_4$, a first connection node $S_4$ and a second connection node $D_4$, where the control node $G_4$ of the fourth P-type transistor $Q_{P4}$ is coupled to the control node $G_3$ of the third P-type transistor $Q_{P3}$ and then coupled to the ground pad 160 through the first resistor $R_1$, the first connection node $S_4$ of the fourth P-type transistor $Q_{P4}$ is coupled to the power pad 150, and the second connection node $D_4$ of the fourth P-type transistor $Q_{P4}$ is coupled to the second resistor $R_2$ and then coupled to the control node $G_2$ of the second P-type transistor $Q_{P2}$. The fourth P-type transistor $Q_{P4}$ is used for providing the second bias voltage $V_{BIAS2}$ to the second P-type transistor $Q_{P2}$.

Please note that, the third P-type transistor $Q_{P3}$, the fourth P-type transistor $Q_{P4}$, the first resistor $R_1$, and the second resistor $R_4$ are not limitations of the present invention, they are merely optional elements. It will be obvious to those skilled in the art that various modifications may be made without departing from the spirit of the present disclosure.

Figure 3:
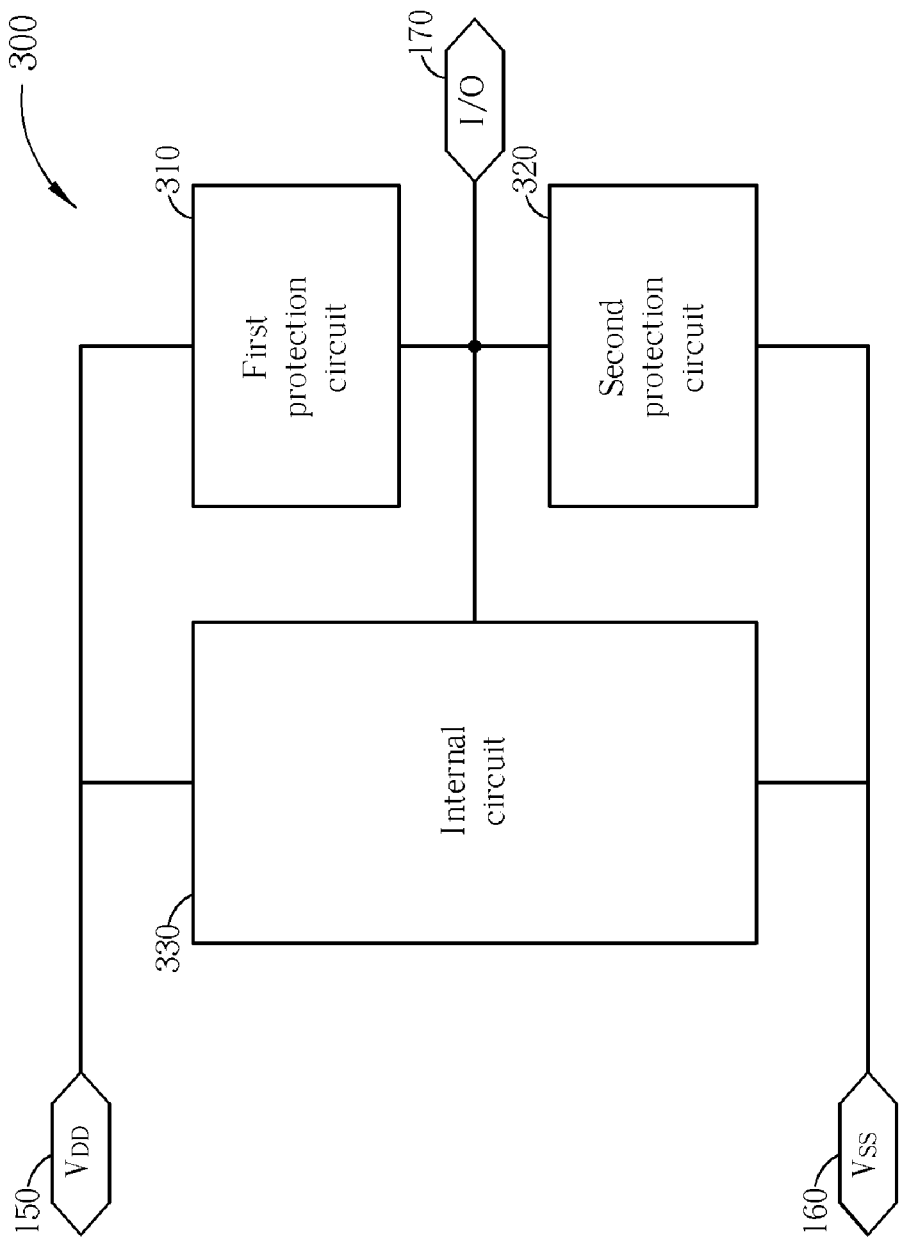
FIG. 3 is a block diagram of an integrated circuit with ESD/EOS protection according to an embodiment of the present invention.

Usually, the above-mentioned ESD/EOS protection circuit is applied for protecting an internal circuit of an integrated circuit. Please refer to FIG. 3. FIG. 3 is a block diagram of an integrated circuit 300 with ESD/EOS protection according to an embodiment of the present invention. The integrated circuit 300 includes an internal circuit 330, a first protection circuit 310, and a second protection circuit 320. The internal circuit 330 is coupled to the I/O pad 170, the power pad 150, and the ground pad 160 of the integrated circuit 300. The first protection circuit 310 is coupled between the I/O pad 170 and the power pad 150. The second protection circuit 320 is coupled between the I/O pad 170 and the ground pad 160. In this embodiment, the first protection circuit 310 can be implemented by the first protection circuit 110 shown in FIG. 1 or the first protection circuit 210 shown in FIG. 2, and the second protection circuit 320 can be implemented by the second protection circuit 120 shown in FIG. 1. Due to the detail description being already disclosed above, it is not described in detail herein for brevity.

In this embodiment, the first protection circuit 310 provides a path for discharge positive pulses and the second protection circuit 320 provides a path for discharge negative pulses. Therefore, no matter what kinds of pulses occur at the I/O pad 170, the first protection circuit 310 and the second protection circuit 320 can provide a path to protect the internal circuit 330 from damage.

Figure 4:
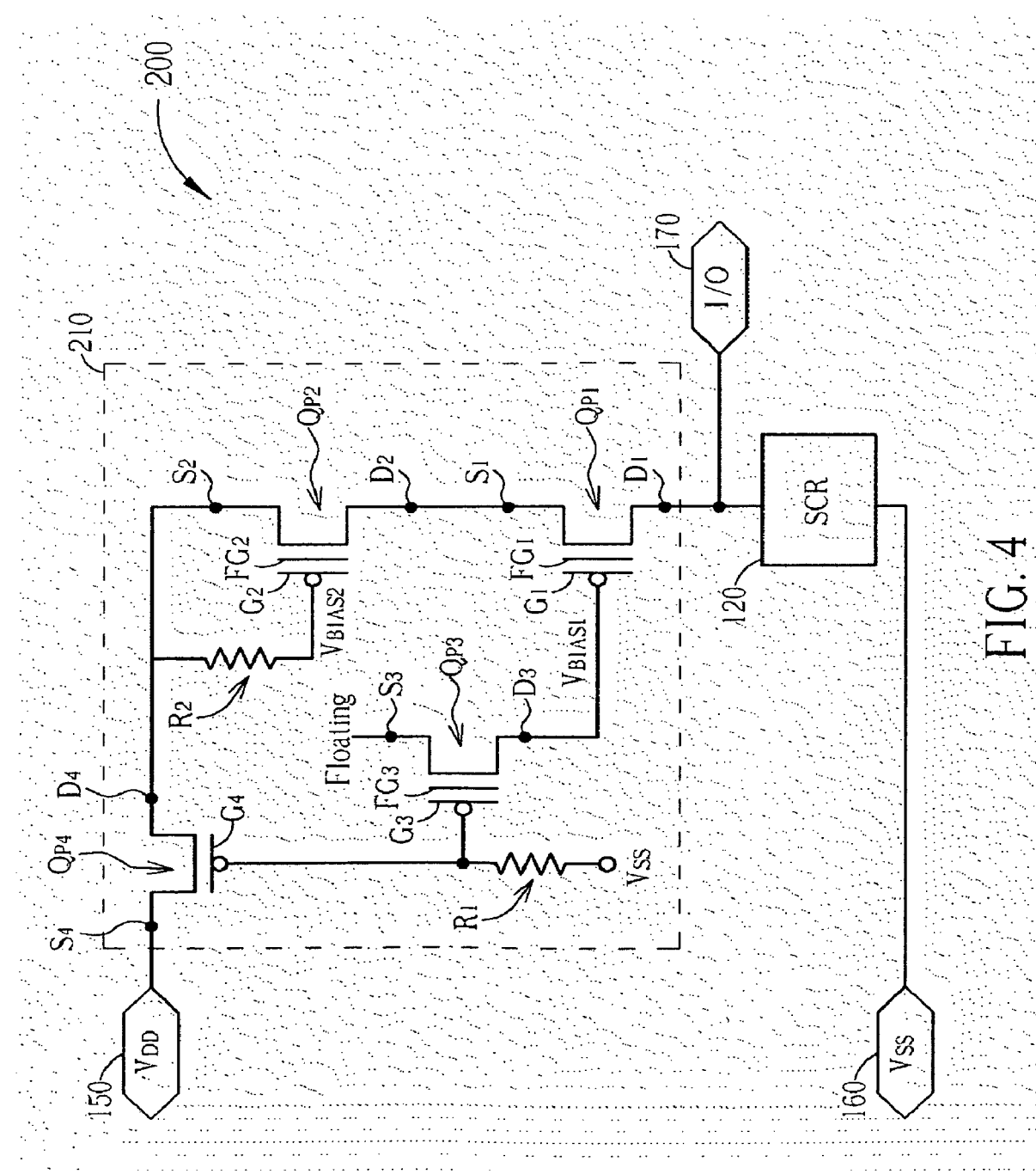
FIG. 4 is a diagram of an ESD/EOS protection circuit according to yet another embodiment of the present invention.

The above-mentioned embodiments are presented merely for describing features of the present invention, and in no way should be considered to be limitations of the scope of the present invention. The above-mentioned first bias voltage $V_{BIAS1}$ and the second bias voltage $V_{BIAS2}$ are not fixed, and can be adjusted depending on circuit's demand. The number of the second P-type transistor $Q_{P2}$ is not limited to one only, and can be expanded to a plurality of second P-type transistor $Q_{P2}$ cascaded. Furthermore, the second protection circuit 120 is not limited to the diode, and can be an SCR (silicon control rectifier) as shown in FIG. 4 or a MOSFET (metal oxide semiconductor field effect transistor). Please note that, the third P-type transistor $Q_{P3}$, the fourth P-type transistor $Q_{P4}$, the first resistor $R_1$, and the second resistor $R_4$ are not limitation of the present invention, they are merely optional elements.

In summary, the present invention provides an ESD/EOS protection circuit and related integrated circuit. Through the ESD/EOS protection circuit of the present invention, the first protection circuits 110, 210 or 310 can provide a path for discharging positive ESD pulses and the second protection circuits 120, 220, or 320 can provide a path for discharging negative ESD pulses. Therefore, no matter what kinds of pulses occur at the I/O pad 170, the ESD/EOS protection circuit disclosed in the present invention can provide a path to protect the internal circuit 330 from damage. Furthermore, the MOS transistor's gate oxide within the ESD/EOS protection circuit won't be damaged by unexpected voltage pulse easily. In addition to providing desired ESD protection, the ESD/EOS protection circuit with the disclosed first protection circuit 210 or 310, has improved EOS performance. It should be noted that the first P-type transistor $Q_{P1}$ and the second P-type transistor $Q_{P2}$ are both turned off in normal operations (such as +5V). Therefore, no leakage current will occur flowing from the I/O pad 170 to the power pad 150.

Those skilled in the art will readily observe that numerous modifications and alterations of the device and method may be made while retaining the teachings of the invention.

What is claimed is:

1. An ESD/EOS protection circuit, comprising:
   a first protection circuit, coupled between an I/O pad and a power pad, the first protection circuit comprising:
      a first P-type transistor having a control node, a first connection node, and a second connection node, wherein the control node of the first P-type transistor is coupled to a bias voltage, the first connection node of the first P-type transistor is coupled to the power pad, and the second connection node of the first P-type transistor is coupled to the I/O pad; and
      a third P-type transistor, having a control node, a first connection node and a second connection node, where the control node of the third P-type transistor is coupled to the ground pad, the second connection node of the third P-type transistor is coupled to the control node of the first P-type transistor, and the first connection node of the third P-type transistor is floating, the third P-type transistor is used for providing the bias voltage to the first P-type transistor; and
   a second protection circuit, coupled between the I/O pad and a ground pad.

2. The ESD/EOS protection circuit of claim 1, wherein the first protection circuit further comprises at least a second P-type transistor, the first P-type transistor and the second P-type transistor are cascaded between the power pad and the I/O pad.

3. The ESD/EOS protection circuit of claim 1, wherein the second protection circuit comprises a diode.

4. The ESD/EOS protection circuit of claim 1, wherein the second protection circuit comprises an SCR (silicon control rectifier).

5. The ESD/EOS protection circuit of claim 1, wherein the first protection circuit further comprises:
   a first resistor, coupled between the ground pad and the control node of the third P-type transistor.

6. The ESD/EOS protection circuit of claim 1, wherein the first protection circuit further comprises:
   at least a second P-type transistor, where the first P-type transistor and the second P-type transistor are cascaded between the power pad and the I/O pad; and
   a fourth P-type transistor, having a control node, a first connection node, and a second connection node, where the control node of the fourth P-type transistor is coupled to the control node of the third P-type transistor and to the ground pad, the first connection node of the fourth P-type transistor is coupled to the power pad, and the second connection node of the fourth P-type transistor is coupled to the control node of the second P-type transistor for providing a second bias voltage to the second P-type transistor.

7. The ESD/EOS protection circuit of claim 6, wherein the first protection circuit further comprises:
   a second resistor, coupled between the second connection node of the fourth P-type transistor and the control node of the second P-type transistor.

8. An integrated circuit with ESD/EOS protection, comprising:
   an internal circuit, coupled to an I/O pad, a power pad, and a ground pad of the integrated circuit;
   a first protection circuit, coupled between the I/O pad and the power pad, the first protection circuit comprising:
      a first P-type transistor having a control node, a first connection node, and a second connection node, wherein the control node of the first P-type transistor is coupled to a bias voltage, the first connection node of the first P-type transistor is coupled to the power pad, and the second connection node of the first P-type transistor is coupled to the I/O pad; and
      a third P-type transistor, having a control node, a first connection node and a second connection node, where the control node of the third P-type transistor is coupled to the ground pad, the second connection node of the third P-type transistor is coupled to the control node of the first P-type transistor, and the first connection node of the third P-type transistor is floating, the third P-type transistor is used for providing the bias voltage to the first P-type transistor; and
   a second protection circuit, coupled between the I/O pad and the ground pad.

9. The integrated circuit with ESD/EOS protection of claim 8, wherein the first protection circuit further comprises:
   a first resistor, coupled between the ground pad and the control node of the third P-type transistor.

10. The integrated circuit with ESD/EOS protection of claim 8, wherein the first protection circuit further comprises:
    at least a second P-type transistor, where the first P-type transistor and the second P-type transistor are cascaded between the power pad and the I/O pad; and
    a fourth P-type transistor, having a control node, a first connection node, and a second connection node, where the control node of the fourth P-type transistor is coupled to the control node of the third P-type transistor and to the ground pad, the first connection node of the fourth P-type transistor is coupled to the power pad, and the second connection node of the fourth P-type transistor is coupled to the control node of the second P-type transistor for providing a second bias voltage to the second P-type transistor.

11. The integrated circuit with ESD/EOS protection of claim 10, wherein the first protection circuit further comprises:
    a second resistor, coupled between the second connection node of the fourth P-type transistor and the control node of the second P-type transistor.

* * * * *